US010571871B2

(12) United States Patent
Zhang et al.

(10) Patent No.: US 10,571,871 B2
(45) Date of Patent: Feb. 25, 2020

(54) AUTOMATIC LOADING SYSTEM AND METHOD FOR SERVICE FUNCTIONS OF HYDRAULIC MACHINE

(71) Applicant: Hefei University of Technology, Hefei, Anhui (CN)

(72) Inventors: Qiang Zhang, Anhui (CN); Shanlin Yang, Anhui (CN); Zhanglin Peng, Anhui (CN); Jun Pei, Anhui (CN); Xiaonong Lu, Anhui (CN)

(73) Assignee: Hefei University of Technology, Hefei (CN)

( * ) Notice: Subject to any disclaimer, the term of this patent is extended or adjusted under 35 U.S.C. 154(b) by 0 days.

(21) Appl. No.: 16/056,045

(22) Filed: Aug. 6, 2018

(65) Prior Publication Data
US 2019/0041809 A1 Feb. 7, 2019

(30) Foreign Application Priority Data
Aug. 7, 2017 (CN) .......................... 2017 1 0666932

(51) Int. Cl.
G05B 13/02 (2006.01)
F15B 21/08 (2006.01)
(Continued)

(52) U.S. Cl.
CPC ............ *G05B 13/028* (2013.01); *F15B 21/08* (2013.01); *G05B 19/188* (2013.01); *G06N 7/005* (2013.01); G05B 2219/41273 (2013.01)

(58) Field of Classification Search
CPC .............. G05B 13/028; G05B 19/188; G05B 2219/41273; F15B 21/08; G06N 7/005
See application file for complete search history.

(56) References Cited

U.S. PATENT DOCUMENTS

2013/0097414 A1* 4/2013 Bishop ................ G06F 9/44521
713/100
2013/0103250 A1* 4/2013 Patankar ............. G06F 11/3604
701/29.1

FOREIGN PATENT DOCUMENTS

CN 101699356 A 4/2010
CN 102208080 A 10/2011
(Continued)

OTHER PUBLICATIONS

Diagnosing Faults for Aircraft Hydraulic Pump Based on Symbol Dynamics Information Entropy and SVM; Zhang, Hua et al.; Apr. 30, 2017.

(Continued)

*Primary Examiner* — Charles E Anya
(74) *Attorney, Agent, or Firm* — Wayne & Ken, LLC; Tony Hom

(57) ABSTRACT

The present invention discloses an automatic loading system and method for service functions of a hydraulic machine. The loading system includes an acquiring portion for acquiring i service function component chains of a hydraulic machine, a determining portion for determining a demand sequence of the service function component chains used by a user within each preset time period in a measuring cycle based on the acquired service function component chains and a deciding portion for automatically loading a service function of the hydraulic machine in a next moment according to the demand sequence based on a current input operation command of the user. By adopting the automatic loading system or method provided by the present invention, response speed of intelligent services of the hydraulic machine can be improved.

17 Claims, 5 Drawing Sheets

(51) Int. Cl.
    *G06N 7/00*           (2006.01)
    *G05B 19/18*        (2006.01)

(56) References Cited

FOREIGN PATENT DOCUMENTS

| | | |
|---|---|---|
| CN | 102411594 A | 4/2012 |
| CN | 105761110 A | 7/2016 |
| CN | 106611366 A | 5/2017 |

OTHER PUBLICATIONS

Diagnosing Faults for Aircraft Hydraulic System Based on Information Entropy and Multi-Classification SVM, Dou Dandan et al, Aug. 31, 2012.

\* cited by examiner ately AUTOMATIC LOADING SYSTEM AND METHOD FOR SERVICE FUNCTIONS OF HYDRAULIC MACHINE

CROSS-REFERENCE TO RELATED APPLICATIONS

This application claims priority to Chinese application no. 201710666932.3 with a filing date of Aug. 7, 2018. The content of the aforementioned application, including any intervening amendments thereto, are incorporated herein by reference.

TECHNICAL FIELD

The present invention relates to the field of intelligent services, and particularly relates to an automatic loading system and method for service functions of a hydraulic machine.

BACKGROUND

Hydraulic forming technologies of a hydraulic machine are widely applied in the industries of automobiles, aviation, aerospace, pipelines, etc., and are mainly applicable to circular, rectangular or specially-shaped sectional hollow structural elements which change along the axes of the structural elements. Applicable materials for the hydraulic forming technologies include carbon steel, stainless steel, aluminum alloy, copper alloy, nickel alloy, etc., and are mainly used for automobile accessory factories, electronics factories, electrical appliance factories, heat treatment factories, vehicle accessory factories, gear factories and air-conditioner accessory factories. When the hydraulic machine runs for conducting some operation, a background program of the hydraulic machine temporarily invokes a corresponding subprogram according to an operation command, so that the hydraulic machine often takes a long time to respond. Thus, the working efficiency of the hydraulic machine will be greatly decreased and the user satisfaction will also be greatly reduced.

SUMMARY

The purpose of the present invention is to provide an automatic loading system and method for service functions of a hydraulic machine, so as to solve the problem of slow response rate of the hydraulic machine.

To achieve the above purpose, the present invention provides the following solution:

An automatic loading system for service functions of a hydraulic machine comprises:

an acquiring portion for acquiring i service function component chains of a hydraulic machine, wherein the service function component chains are service processes of the service functions of the hydraulic machine obtained by combining user service demands, different operation condition data of the hydraulic machine and operation history data of the hydraulic machine, the service functions comprise fault early warning, monitoring, maintenance and system optimization, and i is greater than or equal to 1;

a determining portion for determining a demand sequence of the service function component chains used by a user within each preset time period in a measuring cycle based on the acquired service function component chains; and a deciding portion for automatically loading a service function of the hydraulic machine in a next moment according to the demand sequence based on a current input operation command of the user.

Further, the acquiring portion comprises:

a user service demand acquiring portion for acquiring a user service demand, wherein the user service demand acquiring portion comprises: a user service demand input apparatus, a storing apparatus and a sending apparatus;

an operation condition data acquiring portion for acquiring different operation condition data of the hydraulic machine, wherein the operation condition data acquiring portion comprises an operation condition data sensor, a storing apparatus and a sending apparatus; and an operation history data acquiring portion for acquiring operation history data of the hydraulic machine, wherein the operation history data acquiring portion comprises an operation feedback sensor, a storing apparatus and a sending apparatus.

Further, the acquiring portion further comprises:

a service function deciding portion for obtaining the service functions of the hydraulic machine in combination with the user service demands, the operation condition data and the operation history data, wherein the service function deciding portion comprises a receiving portion, a treating portion, a storing portion, a sending portion and a service function portion.

Further, the service function portion comprises an alarm apparatus, a monitoring apparatus, a maintenance apparatus and a system optimization apparatus.

Further, the determining portion comprises:

a receiving portion for receiving the service function component chains of the hydraulic machine sent by the acquiring portion; and a treating portion for determining a demand sequence of the service function component chains used by a user within each preset time period in a measuring cycle based on the acquired service function component chains.

Further, the treating portion comprises:

a single use frequency acquiring module for acquiring a single use frequency of each of the service function component chains within the preset time period;

a total use frequency acquiring module for computing a total use frequency of the i service function component chains within the preset time period according to the single use frequencies;

a single probability computing module for computing a single probability that each of the service function component chains occurs within the preset time period according to the single use frequencies and the total use frequency;

a single information entropy computing module for computing a single information entropy of each of the service function component chains according to the single probabilities;

an entire information entropy determining module for determining an entire information entropy of the i service function component chains according to the single information entropies;

a demand matrix building module for building a demand matrix of the i service function component chains in the measuring cycle according to the entire information entropy, wherein the measuring cycle is composed of multiple preset time periods; and a demand sequence determining module for determining a demand sequence of the service function component chains used by the user within the preset time periods in the measuring cycle according to the demand matrix.

Further, the determining portion further comprises: a storing portion for storing the service function component chains of the hydraulic machine received by the receiving portion, the single use frequency acquiring module, the total use frequency acquiring module, the single probability computing module, the single information entropy computing module, the entire information entropy determining module, the demand matrix building module, the demand sequence determining module, the demand sequence of the service function component chains used by the user within the preset time periods in the measuring cycle, and an automatic loading module.

Further, the deciding portion comprises:

a user operation command input apparatus for inputting a current operation command of the user; and an automatic loading module for automatically loading a service function of the hydraulic machine in a next moment according to the demand sequence based on the current input operation command of the user.

Further, the single information entropy computing module specifically comprises:

a single information entropy computing unit for computing a single information entropy of each of the service function component chains within the preset time period according to a formula $I(CC_i)=E(-\log P_{CC_i})=-P_{CC_i} \log P_{CC_i}$, wherein $I(CC_i)$ is the single information entropy of each of the service function component chains and $P_{CC_i}$ is a single probability of each of the service function component chains.

Further, the entire information entropy determining module specifically comprises:

an entire information entropy determining unit for computing an entire information entropy of the i service function component chains according to a formula $$I(CC) = \sum_{i=1}^{i} I(CC_i),$$

wherein $I(CC)$ is the entire information entropy and $I(CC_i)$ is the single information entropy of each of the service function component chains.

Further, the demand matrix building module specifically comprises:

a first judging unit for judging whether the entire information entropy is less than 0.5, to obtain a first judging result;

a centralized demand determining unit for determining that a demand of the user for the service function component chains within the preset time period is a centralized demand if the first judging result indicates that the entire information entropy is less than 0.5, wherein a centralized vector of the centralized demand is $\{CC_1=0, CC_2=0, CC_3=0 \ldots, CC_{max}=1\}$; $CC_{max}=\max\{P_{CC_1}, P_{CC_2}, \ldots, P_{CC_i}\}$; $CC_i$ is the service function component chain and $P_{CC_i}$ is the single probability of each of the service function component chains;

a disperse demand determining unit for determining that a demand of the user for the service function component chains within the preset time period is a disperse demand if the first judging result indicates that the entire information entropy is not less than 0.5, wherein a disperse vector of the disperse demand is $\{CC_1=P_{CC_1}, CC_2=P_{CC_2}, CC_3=P_{CC_3}, \ldots, CC_i=P_{CC_i}\}$; and a demand matrix building unit for building a demand matrix of the i service function component chains according to the centralized vector and the disperse vector.

An automatic loading method for service functions of a hydraulic machine comprises:

acquiring i service function component chains, wherein the service function component chains are service processes of the service functions of the hydraulic machine obtained by combining user service demands, different operation condition data of the hydraulic machine and operation history data of the hydraulic machine, wherein the service functions comprise fault early warning, monitoring, maintenance and system optimization, and i is greater than or equal to 1;

acquiring a single use frequency of each of the service function component chains within the preset time period;

computing a total use frequency of the i service function component chains within the preset time period according to the single use frequencies;

computing a single probability that each of the service function component chains occurs within the preset time period according to the single use frequencies and the total use frequency;

computing a single information entropy of each of the service function component chains according to the single probabilities;

determining an entire information entropy of the i service function component chains according to the single information entropies;

building a demand matrix of the i service function component chains in the measuring cycle according to the entire information entropy, wherein the measuring cycle is composed of multiple preset time periods;

determining a demand sequence of the service function component chains used by the user within the preset time periods in the measuring cycle according to the demand matrix; and automatically loading a service function of the hydraulic machine in a next moment according to the demand sequence based on the current input operation command of the user.

Optionally, a step of computing a single information entropy of each of the service function component chains according to the single probabilities specifically comprises:

computing the single information entropy of each of the service function component chains within the preset time periods according to a formula $I(CC_i)=E(-\log P_{CC_i})=-P_{CC_i} \log P_{CC_i}$, wherein $I(CC_i)$ is the single information entropy of each of the service function component chains; and $P_{CC_i}$ is the single probability of each of the service function component chains.

Optionally, a step of determining an entire information entropy of the i service function component chains according to the single information entropies specifically comprises:

computing the entire information entropy of the i service function component chains according to a formula $$I(CC) = \sum_{i=1}^{i} I(CC_i),$$

wherein $I(CC)$ is the entire information entropy and $I(CC_i)$ is the single information entropy of each of the service function component chains.

Optionally, a step of building a demand matrix of the i service function component chains in the measuring cycle according to the entire information entropy specifically comprises:

judging whether the entire information entropy is less than 0.5, to obtain a first judging result;

determining that a demand of the user for the service function component chains within the preset time period is a centralized demand if the first judging result indicates that the entire information entropy is less than 0.5, wherein a centralized vector of the centralized demand is $\{CC_1=0, CC_2=0, CC_3=0 \ldots, CC_{max}=1\}$; $CC_{max}=\max\{P_{CC_1}, P_{CC_2}, \ldots, P_{CCi}\}$; $CC_i$ is the service function component chain and $P_{CCi}$ is the single probability of each of the service function component chains;

determining that a demand of the user for the service function component chains within the preset time period is a disperse demand if the first judging result indicates that the entire information entropy is not less than 0.5, wherein a disperse vector of the disperse demand is $\{CC_1=P_{CC_1}, CC_2=P_{CC_2}, CC_3=P_{CC_3} \ldots, P_{CC_i}\}$; and building a demand matrix of the i service function component chains according to the centralized vector and the disperse vector.

Optionally, a step of determining a demand sequence of the service function component chains used by the user within the preset time periods in the measuring cycle according to the demand matrix specifically comprises:

computing a priority of each of the service function component chains according to the demand matrix; and sequencing the priorities of the i service function component chains according to the priorities of the service function component chain from large to small, to obtain the demand sequence among the service function component chains used within the preset time periods in the measuring cycle, wherein the demand sequence is a sequenced priority.

Optionally, a step of computing a priority of each of the service function component chains according to the demand matrix specifically comprises:

computing the priority of each of the service function component chains according to a formula $$Pr\ i(CC_i) = \frac{\sum_{k=1}^{m} P_{CC_{ik}}}{m},$$

wherein $P_{CC_{ik}}$ is an element in the demand matrix, k is the number of rows of the demand matrix and m is the number of the preset time periods in the measuring cycle.

According to specific embodiments provided by the present invention, the present invention discloses the following technical effects: The present invention counts the single probabilities of different service function component chains within the preset time periods, computes the single information entropies of the service function component chains according to the single probabilities of the multiple different service function component chains, obtains the demand sequence of the multiple service function component chains within the preset time periods based on the multiple single information entropies, and automatically loads the service function of the hydraulic machine in the next moment according to the demand sequence based on the current input operation command of the user without the need of waiting for a long time for the hydraulic machine to respond, thereby not only saving the time and increasing the working efficiency, but also greatly improving the use satisfaction of the user.

BRIEF DESCRIPTION OF DRAWINGS

To more clearly describe the embodiments of the present invention or the technical solution in the prior art, the drawings to be used in the embodiments will be simply presented below. Apparently, the drawings in the following description are merely some embodiments of the present invention, and for those ordinary skilled in the art, other drawings can also be obtained according to these drawings without contributing creative labor.

DETAILED DESCRIPTION

Technical solutions in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

The purpose of the present invention is to provide an automatic loading method and system for service functions of a hydraulic machine, so as to increase the response rate of the hydraulic machine and improve the use satisfaction of the user.

To make the purpose, the features and the advantages of the present invention more clear and easier to understand, the present invention is further described in detail below in combination with the drawings and specific embodiments.

Figure 1:
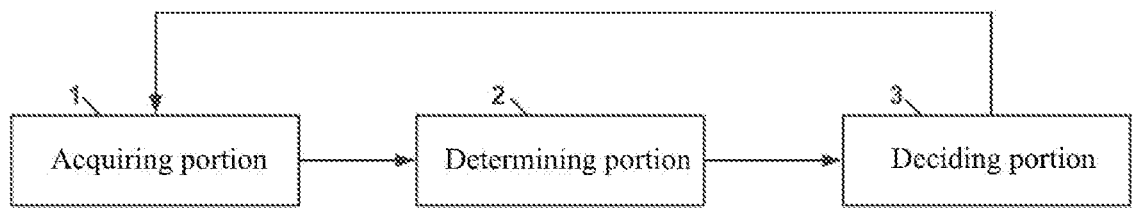
FIG. 1 is a structural schematic diagram of an automatic loading system provided by the present invention.

FIG. 1 shows a structural schematic diagram of an automatic loading system provided by the present invention. An automatic loading system for service functions of a hydraulic machine comprises:

an acquiring portion 1 for acquiring i service function component chains of a hydraulic machine, wherein the service function component chains are service processes of the service functions of the hydraulic machine obtained by combining user service demands, different operation condition data of the hydraulic machine and operation history data of the hydraulic machine, the service functions comprise fault early warning, monitoring, maintenance and system optimization, and i is greater than or equal to 1;

a determining portion 2 for determining a demand sequence of the service function component chains used by a user within each preset time period in a measuring cycle based on the acquired service function component chains; and a deciding portion 3 for automatically loading a service function of the hydraulic machine in a next moment according to the demand sequence based on a current input operation command of the user.

Connection can realize communication via Internet, a dedicated line and other reserved wired or wireless networks.

Figure 2:
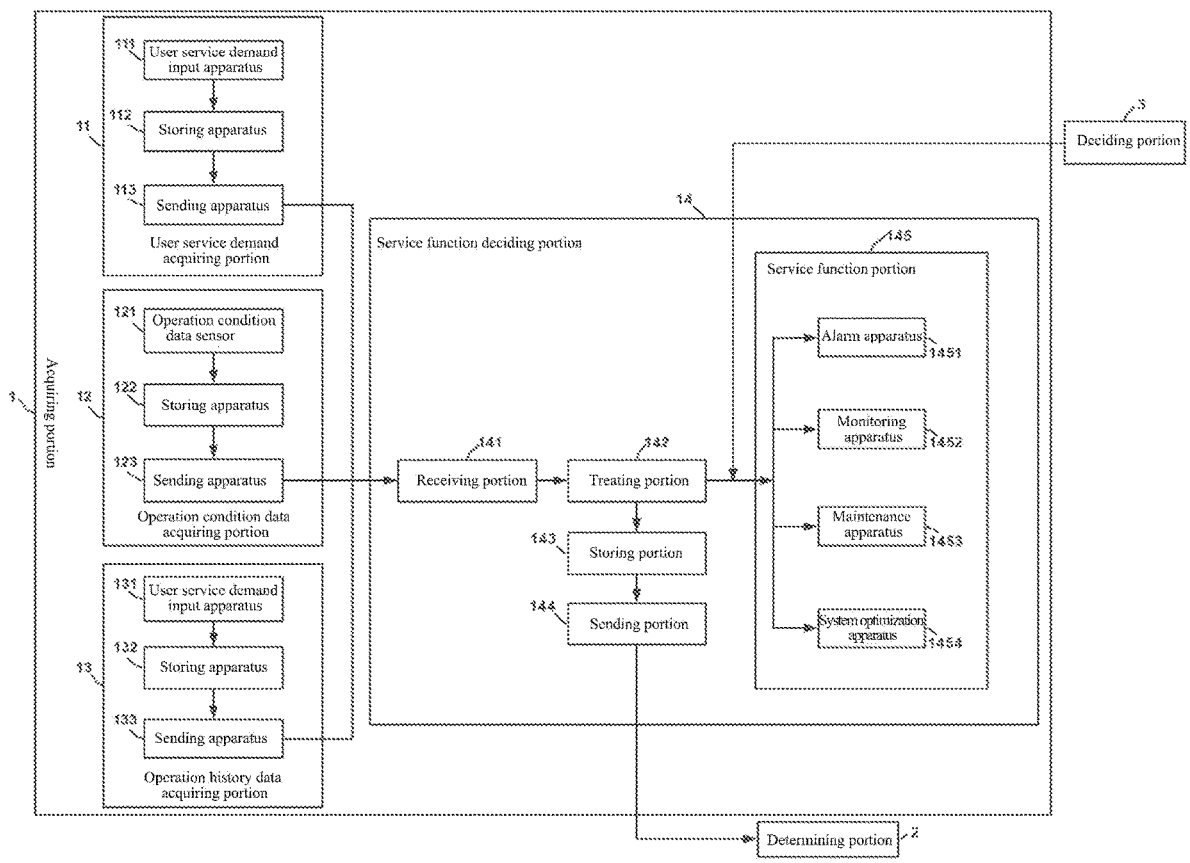
FIG. 2 is a structural schematic diagram of an acquiring portion of an automatic loading system provided by the present invention.

FIG. 2 shows a structural schematic diagram of an acquiring portion for acquiring a single service function component chain in an automatic loading system provided by the present invention.

The acquiring portion 1 comprises:

a user service demand acquiring portion 11 for acquiring a user service demand, wherein the user service demand acquiring portion 11 comprises: a user service demand input apparatus 111, a storing apparatus 112 and a sending apparatus 113; the user service demand input apparatus 111 comprises inputting user demands into the storing apparatus 112 through a keyboard, a mouse, a touch display screen, a display screen and the like, and comprises reading the user demands stored by other in-line storing devices or transmitting user data to the storing apparatus 112 through other devices such as a data line, a network and Bluetooth; the storing apparatus 112 comprises a hard disk, a magnetic disk, a mobile hard disk, a USB flash disk and other physical storing media, and also comprises cloud storage; and the sending apparatus 113 comprises various special data connecting lines and interfaces, network cables and interfaces, network cards, wireless modules, Bluetooth modules and other wired or wireless data transmission apparatuses such as 2.5G, 3G and 4G transmission apparatuses;

an operation condition data acquiring portion 12 for acquiring different operation condition data of the hydraulic machine, wherein the operation condition data acquiring portion 12 comprises an operation condition data sensor 121, a storing apparatus 122 and a sending apparatus 123; the operation condition data sensor 121 mainly comprises transducers on various components or other apparatuses that read operation parameters; the storing apparatus 122 comprises a hard disk, a magnetic disk, a mobile hard disk, a USB flash disk and other physical storing media, and also comprises cloud storage; and the sending apparatus 123 comprises various special data connecting lines and interfaces, network cables and interfaces, network cards, wireless modules, Bluetooth modules and other wired or wireless data transmission apparatuses such as 2.5G, 3G and 4G transmission apparatuses;

an operation history data acquiring portion 13 for acquiring operation history data of the hydraulic machine, wherein the operation history data acquiring portion 13 comprises an operation feedback sensor 131, a storing apparatus 132 and a sending apparatus 133; the operation feedback sensor 131 mainly comprises inputting an operation command through a keyboard, a mouse and a touch screen, executing the command and then feeding back and recording the data to the storing apparatus 132, and also comprises other operation feedback sensors, such as a feedback sensor of opening a safety door and a feedback sensor of pressing emergency brake; the hydraulic machine records the operation history data to the storing apparatus 132 through these feedback sensors; the storing apparatus 132 comprises a hard disk, a magnetic disk, a mobile hard disk, a USB flash disk and other physical storing media, and also comprises cloud storage; and the sending apparatus 133 comprises various special data connecting lines and interfaces, network cables and interfaces, network cards, wireless modules, Bluetooth modules and other wired or wireless data transmission apparatuses such as 2.5G, 3G and 4G transmission apparatuses; and a service function deciding portion 14 for obtaining the service functions of the hydraulic machine in combination with the user service demands, the operation condition data and the operation history data, wherein the service function deciding portion 14 comprises a receiving portion 141, a treating portion 142, a storing portion 143, a sending portion 144 and a service function portion 145.

The receiving portion 141 and the sending portion 144 comprise various special data connecting lines and interfaces, network cables and interfaces, network cards, wireless modules, Bluetooth modules and other wired or wireless data transmission apparatuses such as 2.5G, 3G and 4G transmission apparatuses. The treating portion 142 comprises a processor or a single chip microcomputer, etc., and is loaded with an operating system or various programs. The storing portion 143 comprises a hard disk, a magnetic disk, a mobile hard disk, a USB flash disk and other physical storing media, and also comprises cloud storage.

Preferably, the service function portion 145 comprises an alarm apparatus 1451, a monitoring apparatus 1452, a maintenance apparatus 1453 and a system optimization apparatus 1454.

Figure 3:
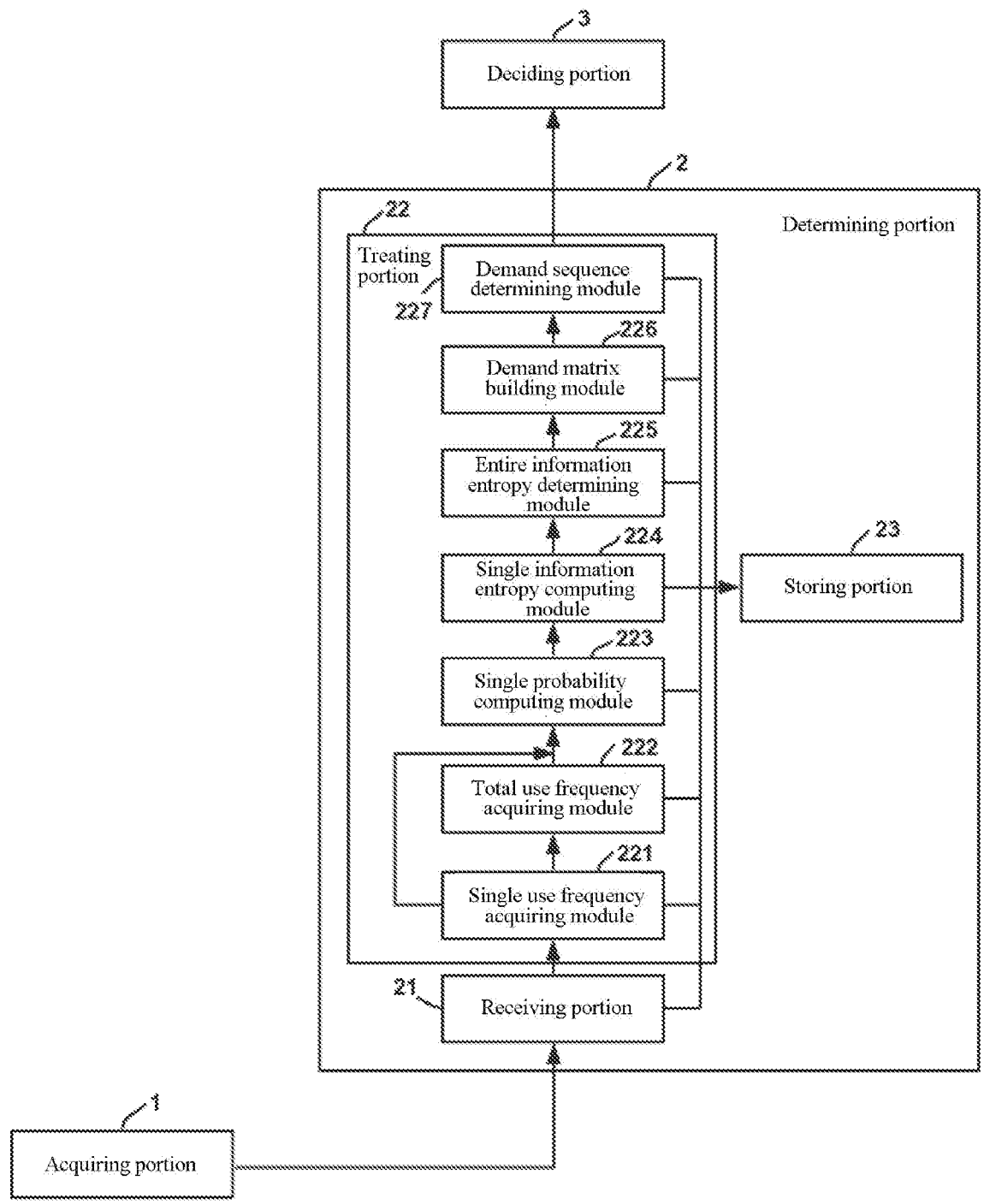
FIG. 3 is a structural schematic diagram of a determining portion of an automatic loading system provided by the present invention.

FIG. 3 shows a structural schematic diagram of a determining portion 2 of an automatic loading system provided by the present invention.

The determining portion 2 comprises:

a receiving portion 21 for receiving the service function component chains of the hydraulic machine sent by the acquiring portion; and a treating portion 22 for determining a demand sequence of the service function component chains used by a user within each preset time period in a measuring cycle based on the acquired service function component chains.

Preferably, the treating portion 22 comprises: a processor or a single chip microcomputer, etc., and is loaded with an operating system or various programs such as driving programs and:

a single use frequency acquiring module 221 for acquiring a single use frequency of each of the service function component chains within the preset time period;

a total use frequency acquiring module 222 for computing a total use frequency of the i service function component chains within the preset time period according to the single use frequencies;

a single probability computing module 223 for computing a single probability that each of the service function component chains occurs within the preset time period according to the single use frequencies and the total use frequency;

a single information entropy computing module 224 for computing a single information entropy of each of the service function component chains according to the single probabilities;

an entire information entropy determining module 225 for determining an entire information entropy of the i service function component chains according to the single information entropies;

a demand matrix building module 226 for building a demand matrix of the i service function component chains in the measuring cycle according to the entire information entropy, wherein the measuring cycle is composed of multiple preset time periods; and a demand sequence determining module 227 for determining a demand sequence of the service function component chains used by the user within the preset time periods in the measuring cycle according to the demand matrix.

Preferably, the single information entropy computing module specifically comprises:

a single information entropy computing unit for computing a single information entropy of each of the service function component chains within the preset time period according to a formula $I(CC_i) = E(-\log P_{CC_i}) = -P_{CC_i} \log P_{CC_i}$, wherein $I(CC_i)$ is the single information entropy of each of the service function component chains and $P_{CC_i}$ is a single probability of each of the service function component chains.

Preferably, the entire information entropy determining module specifically comprises:

an entire information entropy determining unit for computing an entire information entropy of the i service function component chains according to a formula $$I(CC) = \sum_{i=1}^{i} I(CC_i),$$

wherein $I(CC)$ is the entire information entropy and $I(CC_i)$ is the single information entropy of each of the service function component chains.

Preferably, the demand matrix building module specifically comprises:

a first judging unit for judging whether the entire information entropy is less than 0.5, to obtain a first judging result;

a centralized demand determining unit for determining that a demand of the user for the service function component chains within the preset time period is a centralized demand if the first judging result indicates that the entire information entropy is less than 0.5, wherein a centralized vector of the centralized demand is $\{CC_1=0, CC_2=0, CC_3=0 \ldots, CC_{max}=1\}$; $CC_{max}=\max\{P_{CC_1}, P_{CC_2}, \ldots, P_{CC_i}\}$; $CC_i$ is the service function component chain and $P_{CC_i}$ is the single probability of each of the service function component chains;

a disperse demand determining unit for determining that a demand of the user for the service function component chains within the preset time period is a disperse demand if the first judging result indicates that the entire information entropy is not less than 0.5, wherein a disperse vector of the disperse demand is $\{CC_1=P_{CC_1}, CC_2=P_{CC_2}, CC_3=P_{CC_3} \ldots, CC_i=P_{CC_i}\}$; and a demand matrix building unit for building a demand matrix of the i service function component chains according to the centralized vector and the disperse vector.

Preferably, the determining portion 2 further comprises a storing portion 23 for storing the service function component chains of the hydraulic machine received by the receiving portion, the single use frequency acquiring module 221, the total use frequency acquiring module 222, the single probability computing module 223, the single information entropy computing module 224, the entire information entropy determining module 225, the demand matrix building module 226, the demand sequence determining module 227, the demand sequence of the service function component chains used by the user within the preset time periods in the measuring cycle, and an automatic loading module 32. The storing portion 23 comprises a hard disk, a magnetic disk, a mobile hard disk, a USB flash disk and other physical storing media, and also comprises cloud storage.

Figure 4:
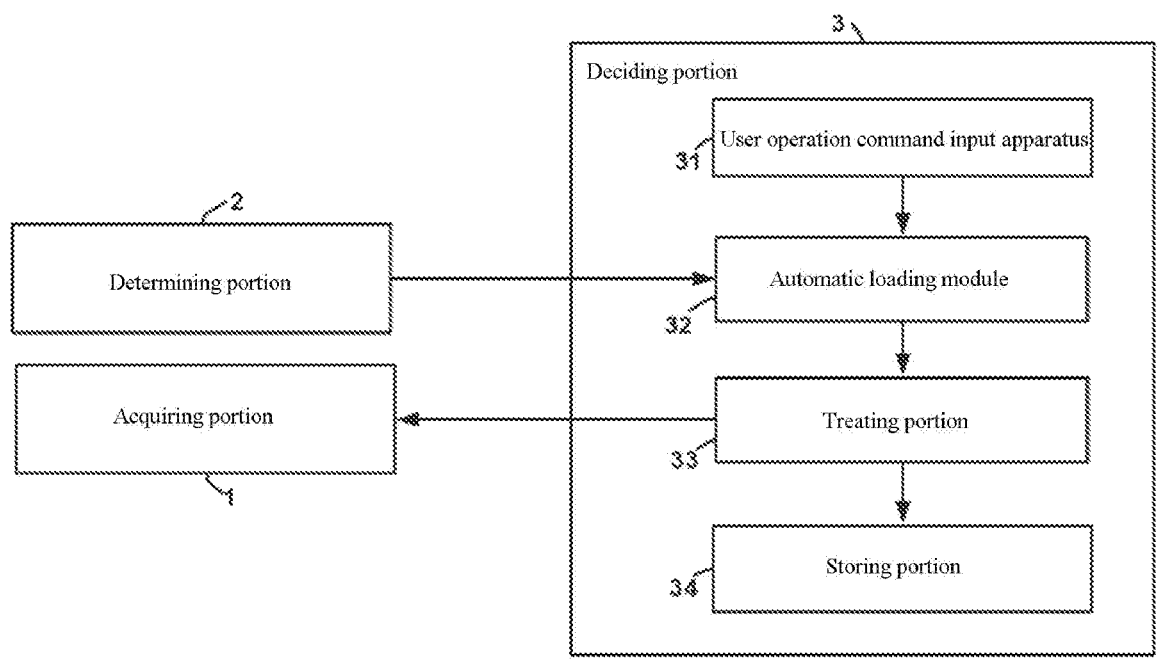
FIG. 4 is a structural schematic diagram of a deciding portion of an automatic loading system provided by the present invention.

FIG. 4 shows a structural schematic diagram of a deciding portion 3 of an automatic loading system provided by the present invention. The deciding portion 3 comprises:

a user operation command input apparatus 31 for inputting a current operation command of the user, comprising a keyboard, a mouse and a touch display screen;

an automatic loading module 32 for automatically loading a service function of the hydraulic machine in a next moment according to the demand sequence based on the current input operation command of the user;

a treating portion 33 comprising a processor or a single chip microcomputer, etc., and loaded with an operating system or various programs, comprising the automatic loading module 32; and a storing portion 34 comprising a hard disk, a magnetic disk, a mobile hard disk, a USB flash disk and other physical storing media, and also comprising cloud storage and for storing the automatic loading module 32.

The treating portion 142, the treating portion 22 and the treating portion 33 may be the same processor or single chip microcomputer, etc. The storing portion 143, the storing portion 23 and the storing portion 34 may be the same hard disk, magnetic disk, mobile hard disk, USB flash disk and other physical storing media.

Through adoption of the automatic loading system provided by the present invention, a service demand rule of the user can be identified, the response capability of the system can be enhanced, the operation time of the user can be saved and the user satisfaction can be improved.

Figure 5:
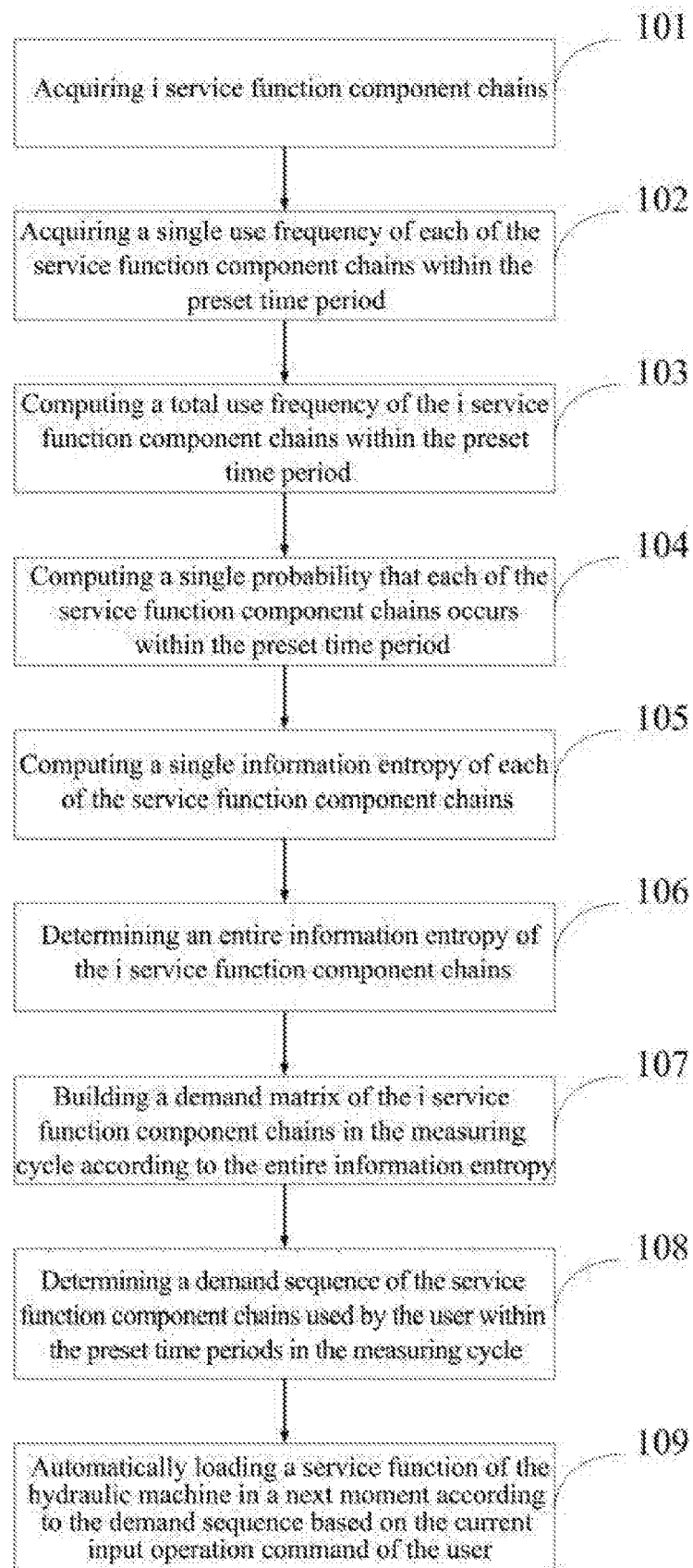
FIG. 5 is a flow chart of an automatic loading method provided by the present invention.

FIG. 5 is a flow chart of an automatic loading method provided by the present invention. As shown in FIG. 5, an automatic loading method for service functions of a hydraulic machine comprises:

Step 101: acquiring i service function component chains, wherein the service function component chains are service processes of the service functions of the hydraulic machine obtained by combining user service demands, different operation condition data of the hydraulic machine and operation history data of the hydraulic machine; the service functions comprise fault early warning, monitoring, maintenance and system optimization; i is greater than or equal to 1; the service function component chain $CC_i$ is composed of a series of service function basic components; and the service function basic components comprise a computing resource service component library $C_{computering}$ of the hydraulic machine, a data collection service component library $C_{collection}$, a data storage service component library $C_{storage}$ and a data analysis service component library $C_{analysis}$, wherein the computing resource service component library comprises a cloud center computing module $C_{cloud-computering}$ and a hydraulic machine computing module $C_{terminal-computering}$.

A service function component chain is formed through the operations of data collection, storage, computing and analysis. Therefore, the intelligent service function component chain represents the function of an intelligent service system and reflects the demand of the user for the intelligent service system.

For example, the service function component chain of the fault early warning service collects displacement data and pressure data into the data collection service component library. If a smaller quantity of tasks needs to be operated and requirements for the processor in the hydraulic machine are low, analysis can be directly conducted on the processor in the hydraulic machine. However, generally, the operation of each service function component chain is relatively complex and a larger quantity of tasks needs to be analyzed, so requirements for a computing module (i.e., the processor) of the hydraulic machine are very high. In this way, the cost of the hydraulic machine is greatly increased. However, through adoption of the automatic loading method provided by the present invention, firstly, a fault analysis service component in the data analysis service component library is invoked in the cloud center computing module to analyze the collected displacement data and pressure data; part of analysis tasks are completed at first; and the rest of the analysis tasks are transmitted to the processor of the hydraulic machine to conduct fault diagnosis and prediction, thereby greatly reducing the computing amount of the processor in the hydraulic machine. The above operation can be completed by adopting the low-cost processor, thereby greatly reducing the cost of the hydraulic machine.

Step 102: acquiring a single use frequency of each of the service function component chains within the preset time period; and computing a single use frequency $F_{CC_i}$ of using the service function component chain $CC_i$ by the user within the preset time period according to a formula $F_{CC_i}$=Count$(CC_i)$.

Step 103: computing a total use frequency of the i service function component chains within the preset time period according to the single use frequencies; and gathering the total use frequency of using different service function component chains by the user within the preset time period according to a formula $$F = (F_{CC_1}, F_{CC_1}, \ldots, F_{CC_i}) = \sum_{i=1}^{n} F_{CC_i}.$$

Step 104: computing a single probability that each of the service function component chains occurs within the preset time period according to the single use frequencies and the total use frequency; and computing the single probability that the service function component chain $CC_i$ occurs within the preset time period according to a formula $$P_{CC_i} = \frac{F_{CC_i}}{F}.$$

Step 105: computing a single information entropy of each of the service function component chains according to the single probabilities; and computing the single information entropy of each of the service function component chains within the preset time period according to a formula $I(CC_i)$= $E(-\log P_{CC_i})$=$-P_{CC_i} \log P_{CC_i}$, wherein $I(CC_i)$ is the single information entropy of the service function component chains and $P_{CC_i}$ is the single probability of each of the service function component chains.

Step 106: determining an entire information entropy of the i service function component chains according to the single information entropies; and computing entire information entropy of the i service function component chains according to a formula $$I(CC) = \sum_{i=1}^{i} I(CC_i),$$

wherein $I(CC)$ is the entire information entropy; $I(CC_i)$ is the single information entropy of the service function component chains; a larger I(CC) value indicates that the use frequencies for different service function component chains are relatively average, i.e., the intelligent service demands of the users within the preset time period are disperse; and a smaller I(CC) value indicates that the use frequencies of the users for different service function component chains are inconsistent, i.e., the intelligent service demands of the users are centralized.

Step 107: building a demand matrix of the i service function component chains in the measuring cycle according to the entire information entropy, wherein the measuring cycle is composed of multiple preset time periods.

In practical application, it is judged whether the entire information entropy in step 106 is less than 0.5. If so, the demand of the user for the service function component chains within the preset time period is determined as a centralized demand. The centralized vector of the centralized demand is $\{CC_1=0, CC_2=0, CC_3=0 \ldots, CC_{max}=1\}$, wherein $CC_{max}$=max$\{P_{CC_1}, P_{CC_2}, \ldots, P_{CC_i}\}$; $CC_i$ is the service function component chain and $P_{CC_i}$ is the single probability of each of the service function component chains. If not, the demand of the user for the service function component chains within the preset time period is determined as a disperse demand. The disperse vector of the disperse demand is $\{CC_1=P_{CC_1}, CC_2=P_{CC_2}, CC_3=P_{CC_3} \ldots, CC_i=P_{CC_i}\}$. The demand matrix RM of the i service function component chains is built according to the centralized vector and the disperse vector.

$$RM = \begin{bmatrix} [\ldots\{CC_{11}=P_{CC_1}, CC_{21}=P_{CC_2}, CC_{31}=P_{CC_3}\ldots, CC_{i1}=P_{CC_i}\}, \ldots, \{CC_{11}=0, CC_{21}=0, CC_{31}=0\ldots, C_{maxn1}=1\}] \\ [\ldots\{CC_{12}=P_{CC_1}, CC_{22}=P_{CC_2}, CC_{32}=P_{CC_3}\ldots, CC_{i2}=P_{CC_i}\}, \ldots, \{CC_{12}=0, C_{22}=0, C_{32}=0\ldots, CC_{maxi2}=1\}] \\ \ldots \quad \ldots \quad \quad \ldots, \quad \quad \ldots \quad \} \\ [\ldots\{CC_{1k}=P_{CC_1}, CC_{2k}=P_{CC_2}, CC_{3k}=P_{CC_3}\ldots, CC_{ik}=P_{CC_i}\}, \ldots, \{CC_{1k}=0, CC_{2k}=0, CC_{3k}=0, CC_{maxnk}=1\}] \end{bmatrix}$$

Step 108: determining a demand sequence of the service function component chains used by the user within the preset time periods in the measuring cycle according to the demand matrix in the step 107; and computing a priority of each of the service function component chains according to a formula $$Pr\ i(CC_i) = \frac{\sum_{k=1}^{m} P_{CC_{ik}}}{m},$$

wherein $P_{CC_{ik}}$ is an element in the demand matrix, m is the number of the preset time periods in the measuring cycle; k is the number of rows of the demand matrix and k is a maximum integer which is less than or equal to m; and sequencing the priorities of the i service function component chains according to the priorities of the service function component chain from large to small, to obtain the demand sequence among the service function component chains used within the preset time periods in the measuring cycle, wherein the demand sequence is a sequenced priority.

Step 109: automatically loading a service function of the hydraulic machine in a next moment according to the demand sequence based on the current input operation command of the user.

The regular demands of the users for the service function component chains within the preset time periods are reflected according to the demand sequence. Corresponding intelligent service basic components are loaded in advance according to the demand sequence and the state of the intelligent service system of the hydraulic machine, so as to satisfy user demands with highest speed and best performance and improve the response capability of the system.

Each embodiment in the description is described in a progressive way. The difference of each embodiment from each other is the focus of explanation of each embodiment. The same and similar parts among all of the embodiments can be referred to each other. For the system disclosed by the embodiments, because the system corresponds to the method disclosed by the embodiments, the system is simply described. Refer to the description of the method part for the related part.

Specific cases are applied herein for elaborating the principle and the embodiments of the present invention, and the illustration of the above embodiments is merely for helping to understand the method and the core idea of the present invention. Meanwhile, for those ordinary skilled in the art, changes may be made to the specific embodiments and the application scope based on the idea of the present invention. In conclusion, the contents of the description should not be interpreted as a limitation to the present invention.

What is claimed is:

1. An automatic loading system for service functions of a hydraulic machine, comprising:
    an acquiring portion for acquiring i service function component chains of a hydraulic machine, wherein the service function component chains are service processes of the service functions of the hydraulic machine obtained by combining user service demands, different operation condition data of the hydraulic machine and operation history data of the hydraulic machine, the service functions comprise fault early warning, monitoring, maintenance and system optimization, and i is greater than or equal to 1;
    a determining portion for determining a demand sequence of the service function component chains used by a user within each preset time period in a measuring cycle based on the acquired service function component chains; and
    a deciding portion for automatically loading a service function of the hydraulic machine in a next moment according to the demand sequence based on a current input operation command of the user, wherein:
    the determining portion comprises:
        a first receiving portion for receiving the service function component chains of the hydraulic machine sent by the acquiring portion; and
        a treating portion for determining the demand sequence of the service function component chains used by the user within each preset time period in the measuring cycle based on the acquired service function component chains, wherein the treating portion comprises:
            a single use frequency acquiring module for acquiring a single use frequency of each of the service function component chains within the preset time period;
            a total use frequency acquiring module for computing a total use frequency of the i service function component chains within the preset time period according to the single use frequencies;
            a single probability computing module for computing a single probability that each of the service function component chains occurs within the preset time period according to the single use frequencies and the total use frequency;
            a single information entropy computing module for computing a single information entropy of each of the service function component chains according to the single probabilities;
            an entire information entropy determining module for determining an entire information entropy of the i service function component chains according to the single information entropies;
            a demand matrix building module for building a demand matrix of the i service function component chains in the measuring cycle according to the entire information entropy, wherein the measuring cycle is composed of multiple preset time periods; and
            a demand sequence determining module for determining the demand sequence of the service function component chains used by the user within the preset time periods in the measuring cycle according to the demand matrix.

2. The automatic loading system according to claim 1, wherein the acquiring portion comprises:
    a user service demand acquiring portion for acquiring a user service demand, wherein the user service demand acquiring portion comprises: a user service demand input apparatus, a first storing apparatus and a first sending apparatus;
    an operation condition data acquiring portion for acquiring different operation condition data of the hydraulic machine, wherein the operation condition data acquiring portion comprises an operation condition data sensor, a second storing apparatus and a second sending apparatus; and
    an operation history data acquiring portion for acquiring operation history data of the hydraulic machine, wherein the operation history data acquiring portion comprises an operation feedback sensor, a third storing apparatus and a third sending apparatus.

3. The automatic loading system according to claim 2, wherein the acquiring portion further comprises:
    a service function deciding portion for obtaining the service functions of the hydraulic machine in combination with the user service demands, the operation condition data and the operation history data, wherein the service function deciding portion comprises a second receiving portion, a treating portion, a first storing portion, a sending portion and a service function portion.

4. The automatic loading system according to claim 3, wherein the service function portion comprises an alarm apparatus, a monitoring apparatus, a maintenance apparatus and a system optimization apparatus.

5. The automatic loading system according to claim 1, wherein the determining portion further comprises:
    a second storing portion for storing the service function component chains of the hydraulic machine received by the receiving portion, the single use frequency acquiring module, the total use frequency acquiring module, the single probability computing module, the single information entropy computing module, the entire information entropy determining module, the demand matrix building module, the demand sequence determining module, the demand sequence of the service function component chains used by the user within the preset time periods in the measuring cycle, and an automatic loading module.

6. The automatic loading system according to claim 5, wherein the deciding portion comprises:
   a user operation command input apparatus for inputting a current operation command of the user; and
   an automatic loading module for automatically loading a service function of the hydraulic machine in a next moment according to the demand sequence based on the current input operation command of the user.

7. The automatic loading system for the service functions of the hydraulic machine according to claim 6, wherein the single information entropy computing module specifically comprises:
   a single information entropy computing unit for computing a single information entropy of each of the service function component chains within the preset time period according to a formula $I(CC_i)=E(-\log P_{CC_i})=-P_{CC_i} \log P_{CC_i}$, wherein $I(CC_i)$ is the single information entropy of each of the service function component chains and $P_{CCi}$ is a single probability of each of the service function component chains.

8. The automatic loading system for the service functions of the hydraulic machine according to claim 6, wherein the entire information entropy determining module specifically comprises:
   an entire information entropy determining unit for computing an entire information entropy of the i service function component chains according to a formula $$I(CC) = \sum_{i=1}^{i} I(CC_i),$$

wherein $I(CC)$ is the entire information entropy and $I(CC_i)$ is the single information entropy of each of the service function component chains.

9. The automatic loading system for the service functions of the hydraulic machine according to claim 6, wherein the demand matrix building module specifically comprises:
   a first judging unit for judging whether the entire information entropy is less than 0.5, to obtain a first judging result;
   a centralized demand determining unit for determining that a demand of the user for the service function component chains within the preset time period is a centralized demand if the first judging result indicates that the entire information entropy is less than 0.5, wherein a centralized vector of the centralized demand is $\{CC_1=0, CC_2=0, CC_3=0 \ldots, CC_{max}=1\}$; $CC_{max}=\max\{P_{CC_1}, P_{CC_2}, \ldots, P_{CC_i}\}$; $CC_i$ is the service function component chain and $P_{CCi}$ is the single probability of each of the service function component chains;
   a disperse demand determining unit for determining that a demand of the user for the service function component chains within the preset time period is a disperse demand if the first judging result indicates that the entire information entropy is not less than 0.5, wherein a disperse vector of the disperse demand is $\{CC_1=P_{CC_1}, CC_2=P_{CC_2}, CC_3=P_{CC_3}, \ldots, CC_i=P_{CC_i}\}$; and
   a demand matrix building unit for building a demand matrix of the i service function component chains according to the centralized vector and the disperse vector.

10. An automatic loading method for service functions of a hydraulic machine, comprising:
    acquiring i service function component chains, wherein the service function component chains are service processes of the service functions of the hydraulic machine obtained by combining user service demands, different operation condition data of the hydraulic machine and operation history data of the hydraulic machine, wherein the service functions comprise fault early warning, monitoring, maintenance and system optimization, and i is greater than or equal to 1;
    acquiring a single use frequency of each of the service function component chains within the preset time period;
    computing a total use frequency of the i service function component chains within the preset time period according to the single use frequencies;
    computing a single probability that each of the service function component chains occurs within the preset time period according to the single use frequencies and the total use frequency;
    computing a single information entropy of each of the service function component chains according to the single probabilities;
    determining an entire information entropy of the i service function component chains according to the single information entropies;
    building a demand matrix of the i service function component chains in the measuring cycle according to the entire information entropy, wherein the measuring cycle is composed of multiple preset time periods;
    determining a demand sequence of the service function component chains used by the user within the preset time periods in the measuring cycle according to the demand matrix; and
    automatically loading a service function of the hydraulic machine in a next moment according to the demand sequence based on the current input operation command of the user.

11. The automatic loading method according to claim 10, wherein a step of computing a single information entropy of each of the service function component chains according to the single probabilities specifically comprises:
    computing the single information entropy of each of the service function component chains within the preset time periods according to a formula $I(CC_i)=E(-\log P_{CC_i})=-P_{CC_i} \log P_{CC_i}$, wherein $CC_i$ is the service function component chain; $I(CC_i)$ is the single information entropy of each of the service function component chains; and $P_{CCi}$ is the single probability of each of the service function component chains.

12. The automatic loading method according to claim 10, wherein a step of determining an entire information entropy of the i service function component chains according to the single information entropies specifically comprises:
    computing the entire information entropy of the i service function component chains according to a formula $$I(CC) = \sum_{i=1}^{i} I(CC_i),$$

wherein $I(CC)$ is the entire information entropy and $I(CC_i)$ is the single information entropy of each of the service function component chains.

13. The automatic loading method according to claim 10, wherein a step of building a demand matrix of the i service function component chains in the measuring cycle according to the entire information entropy specifically comprises:
- judging whether the entire information entropy is less than 0.5, to obtain a first judging result;
- determining that a demand of the user for the service function component chains within the preset time period is a centralized demand if the first judging result indicates that the entire information entropy is less than 0.5, wherein a centralized vector of the centralized demand is $\{CC_1=0, CC_2=0, CC_3=0 \ldots, CC_{max}=1\}$; $CC_{max}=\max\{P_{CC_1}, P_{CC_2}, \ldots, P_{CC_i}\}$; $CC_i$ is the service function component chain and $P_{CCi}$ is the single probability of each of the service function component chains;
- determining that a demand of the user for the service function component chains within the preset time period is a disperse demand if the first judging result indicates that the entire information entropy is not less than 0.5, wherein a disperse vector of the disperse demand is $\{CC_1=P_{CC_1}, CC_2=P_{CC_2}, CC_3=P_{CC_3} \ldots, CC_i=P_{CC_i}\}$; and
- building a demand matrix of the i service function component chains according to the centralized vector and the disperse vector.

14. The automatic loading method according to claim 13, wherein a step of determining a demand sequence of the service function component chains used by the user within the preset time periods in the measuring cycle according to the demand matrix specifically comprises:
- computing a priority of each of the service function component chains according to the demand matrix; and
- sequencing the priorities of the i service function component chains according to the priorities of the service function component chain from large to small, to obtain the demand sequence among the service function component chains used within the preset time periods in the measuring cycle, wherein the demand sequence is a sequenced priority.

15. The automatic loading method according to claim 10, wherein a step of determining a demand sequence of the service function component chains used by the user within the preset time periods in the measuring cycle according to the demand matrix specifically comprises:
- computing a priority of each of the service function component chains according to the demand matrix; and
- sequencing the priorities of the i service function component chains according to the priorities of the service function component chain from large to small, to obtain the demand sequence among the service function component chains used within the preset time periods in the measuring cycle, wherein the demand sequence is a sequenced priority.

16. The automatic loading method according to claim 15, wherein a step of computing a priority of each of the service function component chains according to the demand matrix specifically comprises:
- computing the priority of each of the service function component chains according to a formula $$Pr\ i(CC_i) = \frac{\sum_{k=1}^{m} P_{CC_{ik}}}{m},$$

wherein $P_{CC_{ik}}$ is an element in the demand matrix, k is the number of rows of the demand matrix and m is the number of the preset time periods in the measuring cycle.

17. The automatic loading method according to claim 16, wherein a step of computing a priority of each of the service function component chains according to the demand matrix specifically comprises:
- computing the priority of each of the service function component chains according to a formula $$Pr\ i(CC_i) = \frac{\sum_{k=1}^{m} P_{CC_{ik}}}{m},$$

wherein $P_{CC_{ik}}$ is an element in the demand matrix, k is the number of rows of the demand matrix and m is the number of the preset time periods in the measuring cycle.

* * * * *